United States Patent
Vikman et al.

(10) Patent No.: US 6,505,715 B1
(45) Date of Patent: *Jan. 14, 2003

(54) METHOD OF BRAKING AN ELECTRICALLY DRIVEN VEHICLE

(75) Inventors: Leif Vikman, Mjölby (SE); Göran Valfridsson, Mjölby (SE)

(73) Assignee: BT Industries AB (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,032

(22) Filed: Oct. 7, 1998

(30) Foreign Application Priority Data

Oct. 7, 1997 (SE) ................................ 9703652

(51) Int. Cl.$^7$ ................................ F16D 65/36
(52) U.S. Cl. ........................ 188/156; 303/20
(58) Field of Search ............... 303/3, 16, 20, 303/152, 155; 188/156, 158, 161; 318/757, 362, 370, 371, 372, 373

(56) References Cited

U.S. PATENT DOCUMENTS

| | | | |
|---|---|---|---|
| 3,845,991 A | | 11/1974 | Engle .................... 303/3 |
| 4,240,015 A | * | 12/1980 | White .................... 318/139 |
| 4,398,618 A | | 8/1983 | Hansen .................... 180/273 |
| 4,418,963 A | * | 12/1983 | Sprockhoff .................... 303/3 |
| 4,468,599 A | * | 8/1984 | Berman et al. .................... 318/139 |
| 4,494,199 A | | 1/1985 | Lehmann .................... 364/426 |
| 4,804,893 A | * | 2/1989 | Melocik .................... 318/373 |
| 4,812,777 A | * | 3/1989 | Shirai .................... 303/14 |
| 4,961,042 A | | 10/1990 | Imaseki .................... 318/758 |
| 5,086,865 A | * | 2/1992 | Tanaka et al. .................... 303/152 |
| 5,322,352 A | * | 6/1994 | Ohno et al. .................... 303/3 |
| 5,340,202 A | | 8/1994 | Day .................... 303/19 |
| 5,378,053 A | * | 1/1995 | Patient et al. .................... 303/3 |
| 5,565,751 A | * | 10/1996 | Greiser .................... 318/362 |
| 5,575,542 A | * | 11/1996 | Tanaka et al. .................... 303/155 |
| 5,638,387 A | | 6/1997 | Pallaggi et al. .................... 318/67 |
| 5,660,448 A | * | 8/1997 | Kiesewetter .................... 303/155 |
| 5,839,800 A | * | 11/1998 | Koga et al. .................... 303/152 |
| 5,915,801 A | * | 6/1999 | Taga et al. .................... 303/152 |

FOREIGN PATENT DOCUMENTS

EP          0 664 273          7/1995 ............ B66F/9/24

* cited by examiner

Primary Examiner—Douglas C. Butler
Assistant Examiner—Thomas T. Williams
(74) Attorney, Agent, or Firm—Hayes Soloway PC

(57) ABSTRACT

Method of braking a vehicle driven by an electric motors in particular a industrial truck, where the rotational speed of the motor is reduced according to a predetermined deceleration characteristic (a–d) when baking is activated. Preferably the deceleration characteristic is chosen in dependency of the length of depression of a brake pedal.

25 Claims, 4 Drawing Sheets

METHOD OF BRAKING AN ELECTRICALLY DRIVEN VEHICLE

FIELD OF THE INVENTION

This invention concerns a method of braking a vehicle driven by an electric motor.

BACKGROUND ART

The industrial trucks of today that are used indoors are usually provided with an electric motor in the form of a DC-motor driving a drive wheel via a gearbox. The tuck is further provided with a number of pivot wheels and/or support wheels.

The truck is among other things maneuvered by means of a throttle pedal or accelerator that, dependent on its position, sends signals to an electronic control unit that forwards signals to the control unit of the motor regarding suitable rotational speed for the driving of the truck with the chosen travel speed.

The truck is further maneuvered with a brake pedal that influences hydraulically controlled mechanical brakes that can influence support wheels as well as drive wheels with suitable torque in dependency of the position of the brake pedal.

The truck can also be braked by the driver changing a travel direction switch to opposed travel direction, or alternatively by releasing the accelerator, so called auto-braking, upon which the electronic control unit delivers a signal to the motor control unit to brake the engine with a suitable torque.

These solutions lead to a variation of the braking distance, depending on how heavily loaded the truck is since a heavier load requires greater breaking torque to achieve a given break distance.

Further there is the risk that such a high braking torque is applied that the wheels lock which in addition to leading to longer braking distance also leads to increased wear on the wheels as well as the gearbox. The wheels also risk becoming locked where the friction is insufficient, e.g. at an oil spot, where it thus will be locked when sufficient friction again exists which can give the mentioned damages. Furthermore this can lead to technical control problems since the control system can get the impression of the truck standing still when the wheel no longer rotates and therefore interrupts the braking which then can lead to serious accidents.

Regenerative return of braking energy to the battery can only take place at "motor braking" using travel direction switch or released accelerator.

OBJECT OF THE INVENTION

The object of the invention is to provide a method to brake an industrial truck where the brake distance is relatively independent of the load of the truck, where maximum brake torque can be limited in order to prevent overloading of the gearbox, and where the risk of wheel locking is minimized.

BRIEF STATEMENT OF THE INVENTION

The object of the invention is achieved by controlling the motor so that its rotational speed is reduced according to a predetermined function of the time the deceleration of the motor is thus controlled and therewith also the deceleration of the driving wheel and the track according to a predetermined characteristic. Accordingly a constant brake distance is obtained independent of load since the control unit controls the motor with the braking torque required to achieve the desired deceleration, where tis the braking torque varies with the load.

By choosing a suitable characteristic a deceleration can be obtained that at permitted loads gives a braking torque that do not cause damage to the gearbox and minimizes the risk of the wheel becoming locked since it has a rotation speed proportional to that of the motor.

Regenerative feedback of brake energy to the battery can take place in some known way.

In one embodiment of the invention different deceleration characteristics can be used dependent on the activated position of the control means. Thus the truck can be triggered to a faster braking (greater deceleration) the more the brake pedal is depressed.

In another embodiment of the invention supplementary brake systems can be triggered when the brake pedal is depressed further than a predetermined position. Hence the motor need only to be fed with the braking current/torque that is required in addition to the braking torque of the supplementary system/systems and a relatively powerful deceleration can be achieved.

BRIEF DESCRIPTION OF THE DRAWINGS

Further features and advantages of the invention are apparent from the below described preferred embodiment with reference to the enclosed figures wherein.

DESCRIPTION OF AN EMBODIMENT

Figure 1:
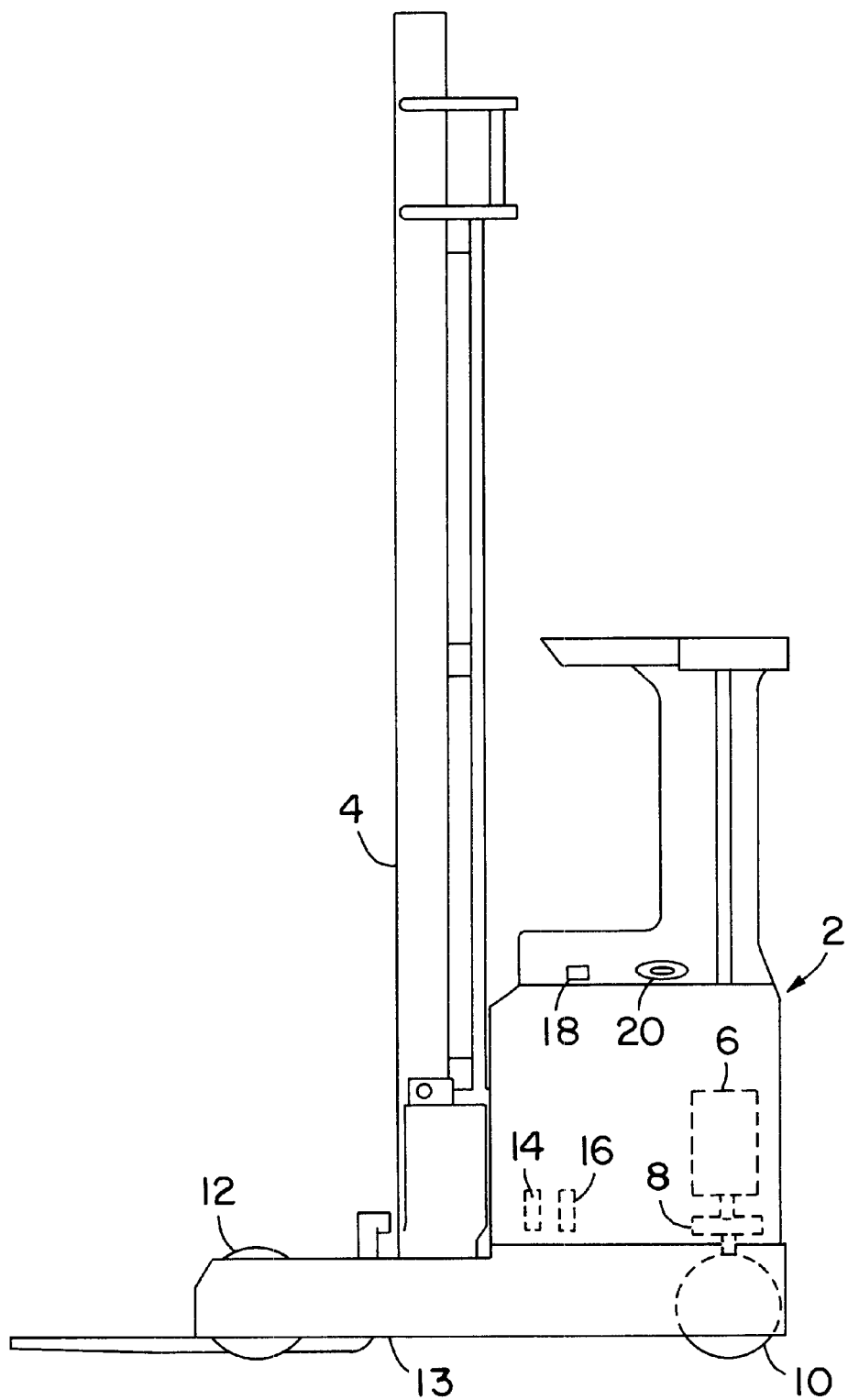
FIG. 1 shows a schematic view of a truck.
Figure 2:
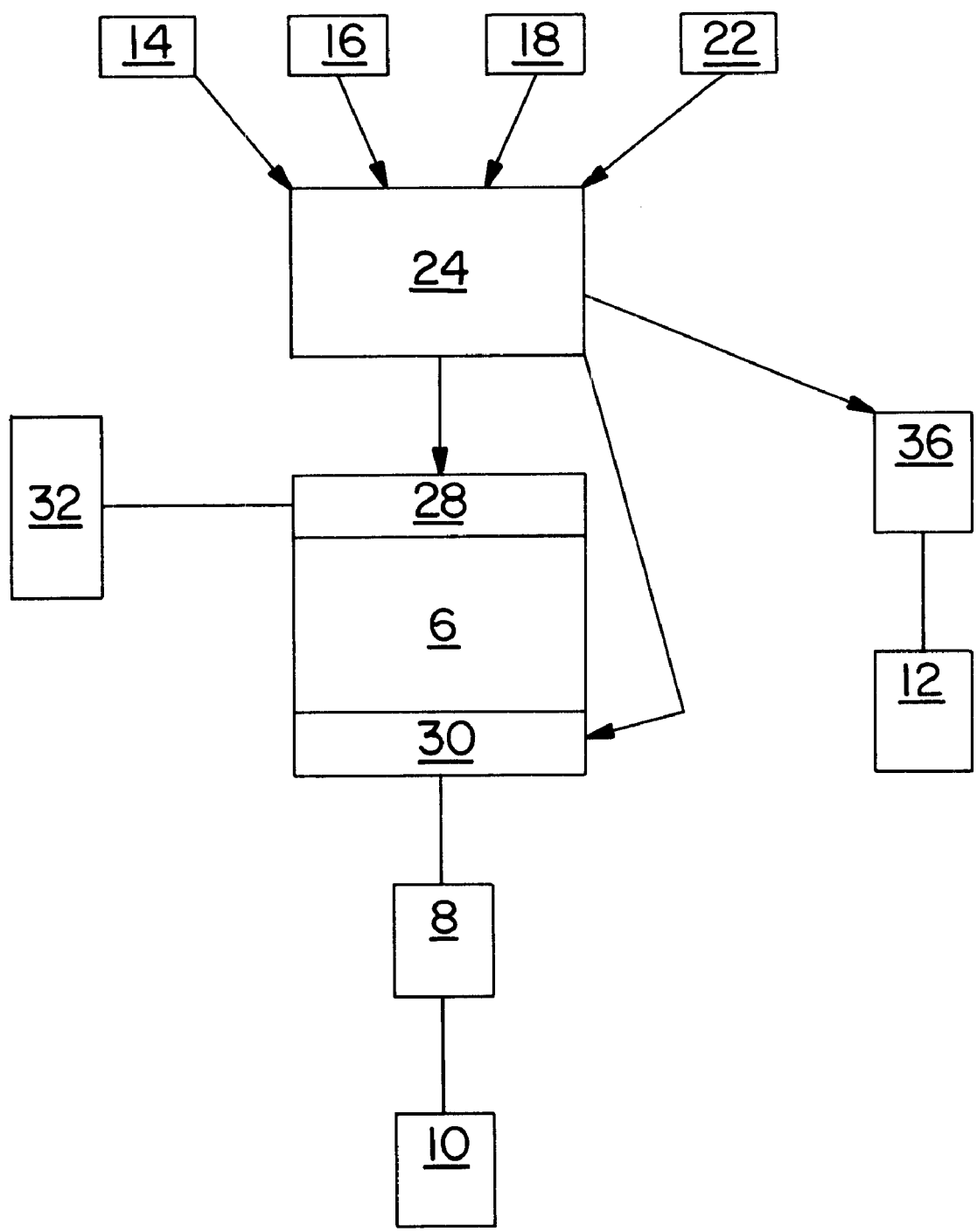
FIG. 2 shows schematically the components of the brake system of the truck.
Figure 3:
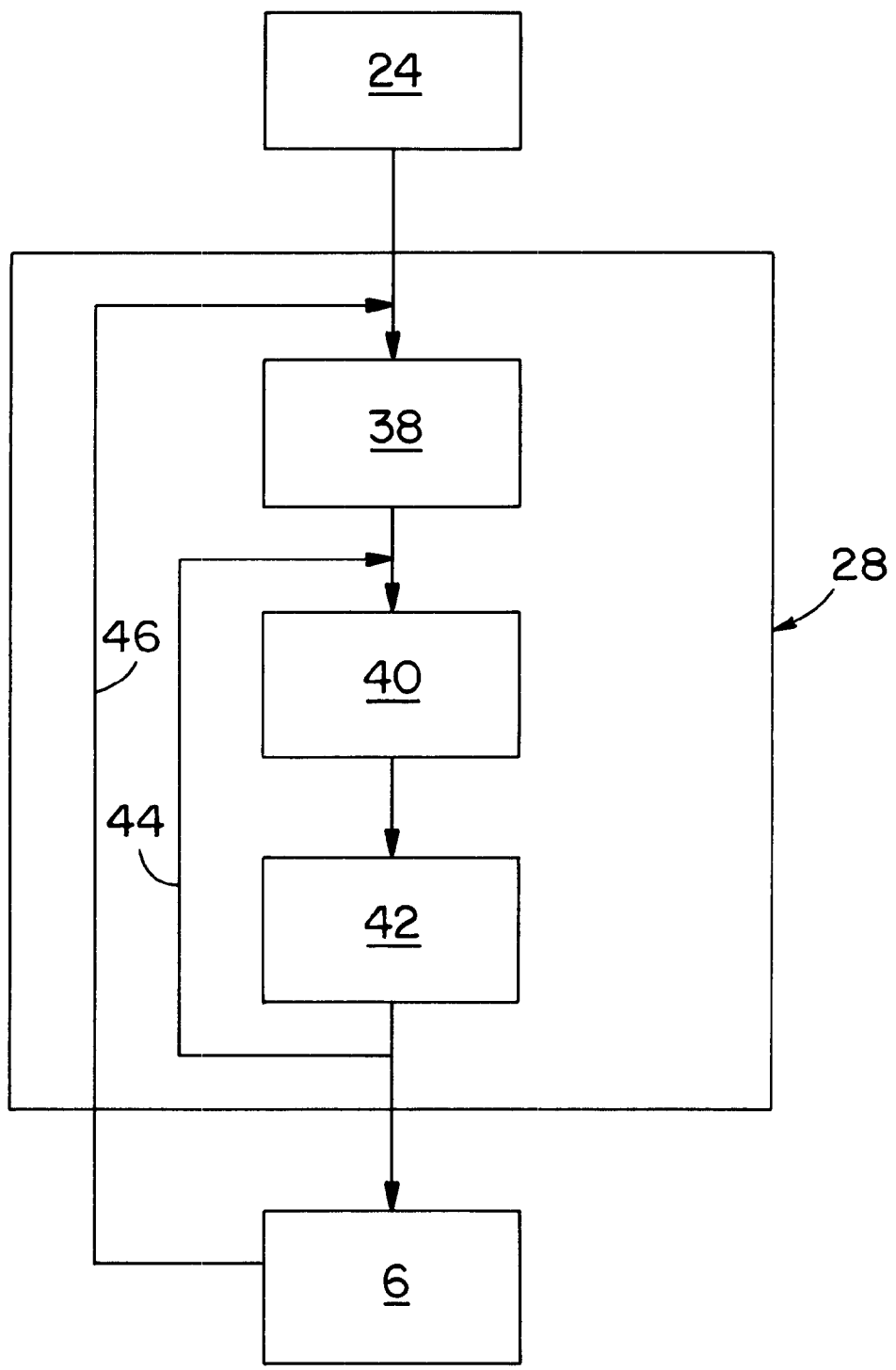
FIG. 3 shows a more detailed picture of the control unit of the motor according to FIG. 2.
Figure 4:
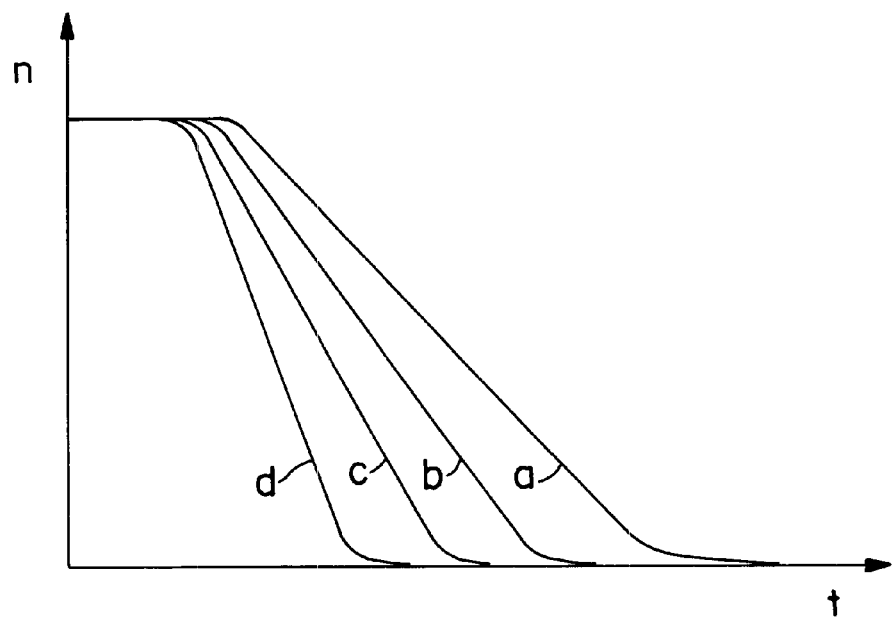
FIG. 4 shows a diagram of the motor rotational speed n as a function of the time t dependant of the brake pedal depression.

The industrial truck 1 shown in FIG. 1 is preferably used indoors and includes as essential parts a chassis 2 to which a mast assembly 4 for the handling of goods is arranged. The truck is driven via an asynchronous motor 6 transferring power to a driving wheel 10 via a gearbox 8. The truck is further provided with support wheels 12 in the front end of the support arms 13. The support wheels 12 and the drive wheel 10 can be braked with electromagnetic brakes (not shown in FIG. 1).

The truck is maneuvered in the usual way with among other things an accelerator 14 and a break pedal 16 whose starting position is defined as fully released position. Further there is a travel direction switch 18 and a steering wheel 20. The components for goods handling are maneuvered in some known manner that does not influence the invention and are therefor not described here.

At use the driver gives signals to the truck regarding desired travel speed in the usual way by means of the accelerator 14. When the driver depresses the accelerator 14 a signal is delivered to an electronic control unit 24 that in turn delivers a signal to a motor control unit 28 that control the motor 6. The signal that is transmitted to the electronic control unit varies dependent on how far the accelerator 14 is depressed and the electronic control unit 24 then delivers a signal to the motor control unit 28 to run the motor with a rotational speed corresponding to the accelerator position.

More specifically this is achieved by the electronic control unit 24 delivering a signal of desired rotational speed to a rotational speed controller 38 in the electronic control unit delivering a signal to a torque controller 40 that via a power controller 42 delivers a current to the motor 6 with an amperage corresponding to suitable torque for the desired rotational speed. The signals are controlled in the usual manner by means of feedback 44, 46 of actual values to the rotational speed controller 38 and the torque controller 40.

The braking method according to the invention according to the invention is now described below with reference to the FIGS. 2–5.

Principally one can say that the driver can brake the trick in three different ways by means of different control means; with the brake pedal 16, by changing travel direction by means of the travel direction switch 20, or by releasing the accelerator and letting the truck motor brake. The method for controlling with the brake pedal is now described below.

When the driver depresses the brake pedal 16 a signal is delivered to the motor 6 via the electronic control unit 24 and the motor control unit 28 to reduce the rotational speed of the motor according to a characteristic with a predetermined deceleration. The deceleration characteristic is preferably constituted of the rotational speed as a function of the time. The controlling is done in a way that corresponds to the above method of accelerating. The signal transmitted to the electronic control unit 24 varies dependent of how far the pedal 16 is depressed with more depression giving a steeper characteristic, which thus gives a greater deceleration and thus a more powerful braking. This is apparent from FIG. 4 where the characteristics a–d show different decelerations dependant of how far the pedal is depressed, where characteristic d shows the greatest deceleration, that is the most powerful braking.

Since the driving wheel 10 is connected to the motor 6 via a fixed gear 8 its rotational speed is directly proportional to the motor rotational speed and its brake distance is therefor the same independent of load sine the control system will provide the motor with the braking torque that is required.

By choosing these characteristics in suitable maimer it is possible to avoid so powerful torques that the wheel locks at normal friction. In this way damages that otherwise may occur are avoided.

Since the wheel the entire time rotates with a given speed the properties at temporary slippery places are improved, as for instance small oil spots. Here the wheel of course risks to slip on the ground reducing the deceleration of the truck, but the wheel is not locked entirely but will rotate according to the given characteristic and when sufficient friction exists again the truck continues to decelerate.

Regeneration of brake energy to the battery 32 of the truck can be achieved in some known manner.

Cases may occur, in particular with a heavily loaded truck and high initial speed, where only braking through controlling the motor torque as described above can not provide sufficient brake power to brake the truck according to the desired characteristic. This is of course not desirable from the point of safety since this leads to a longer braking distance.

This problem is solved by the following:

When the brake pedal is depressed past a first predetermined position, for instance 50% of maximum depression, a supplementary brake system is activated. In this case it is an electromagnetic brake 36 working on the support wheels 12 when an incoming signal is received from the electronic control unit 24.

Figure 5:
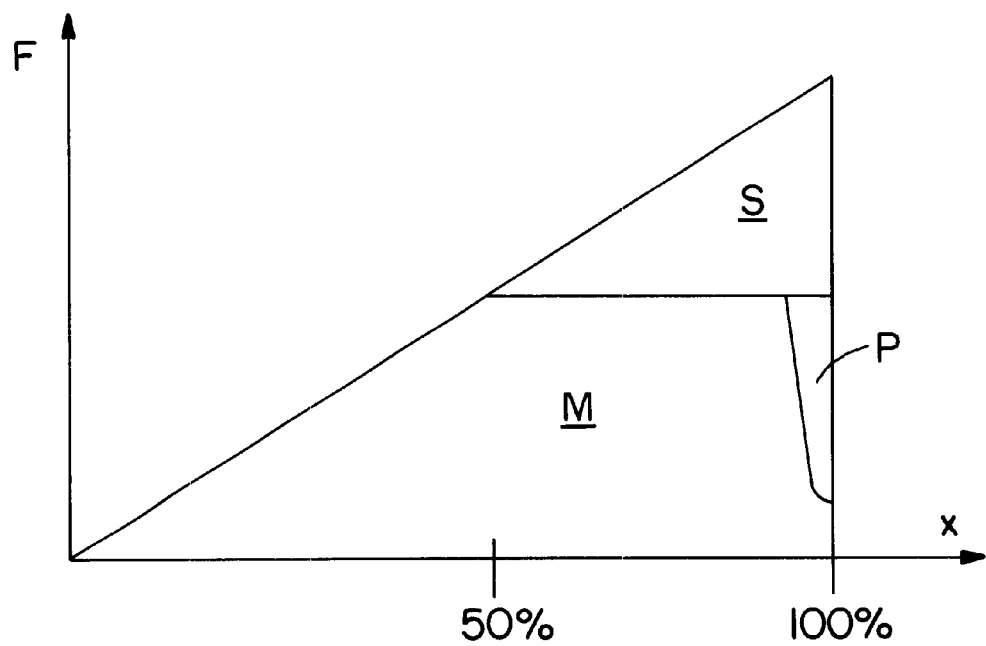
FIG. 5 shows a diagram of the brake force F as a function of the brake pedal depression x.

This brake 36 is analogous so that the braking torque increases with increased pedal depression past the mentioned position. The electronic control unit however continue to deliver a signal to the motor control unit 28 to follow the default characteristic a–d, possibly a steeper characteristic is chosen since the pedal depression increases. This results in the rotational speed of the motor following the characteristic according to FIG. 4 and the deceleration and wheel speed follow this independent of the activation of the support wheel brake. The resulting difference is that the motor control unit 28 will adjust to give the motor 6 the braking torque (motor brake) that is required in addition to the torque from the support wheel brake 36. In FIG. 5 the braking force F is a function of the brake pedal depression x. From this it is apparent the contribution M from the motor brake ceases to increase at 50% depression of the pedal 16 and that the support wheel brake contributes with the remaining part of the required brake torque S. Depending on the type of operation, percentage distribution of the contributions may vary some. Thus in some cases the contribution of the motor brake may decrease somewhat when the support wheel brake is activated.

It is desirable to dimension the controlling so that the motor brake takes as large a part as possible of the brake energy since only this contribution can be used for regenerative feedback, and to reduce the wear of the supplementary support wheel brake.

Furthermore additional supplementary brake systems can be activated as the pedal depression continues. According to the preferred embodiment shown here a final digital one step brake 30 is activated Just before the pedal 16 reaches its bottom position This brake subjects the driving wheel to a predetermined braking torque. Owing to this the motor brake only has to contribute with the torque that is required in addition to the torques of the one step brake 30 and the support wheel brake 36. The one step brake is preferably constituted of the same electromagnetic brake that is used as a parking brake and its brake contribution is in FIG. 5 denoted with P.

In this way the truck is braked according to a predetermined deceleration dependent of the degree of pedal depression, but where the electronic control system activates supplementary brake devices in differing degree depending on type of operation so that the predetermined deceleration progress is followed independent of type of operation. The support wheel brake and parking brake are activated first after a predetermined pedal movement so that the motor brake can contribute with as big a part as possible and without the driver actually having to observe that different brake systems are activated. An even and secure brake progress is obtained.

The brake progress can in the normal way be disrupted before the truck bas stopped entirely by the driver releasing the pedal to its initial position.

According to a further embodiment of the invention the inclinations of he characteristics a–d can be set differently depending on type of truck or actual driving conditions. This is preferably achieved by adjustment of a parameter that influence the electronic control unit 24, the parameter can preferably be changed by a service engineer.

Braking by means of the travel directions switch 18 is done in principally the same way when the driver signals changed travel direction, the motor being braked in the same way by the electronic control unit deliver signals concerning desired deceleration. Also here a number of deceleration characteristics ad corresponding to FIG. 4 can exist. These are chosen depending the position of the accelerator 14 where a more depressed pedal gives a more powerful deceleration. Adjustment of the parameter 22 is possible here also. At this type of braking however the supplementary brakes 36, 30 are never activated.

The same principal method is also used at so called auto braking where de truck is braked when the driver ease up the accelerator. Here also the parameter 22 can be changed in order to enable a different choice of characteristics corresponding to FIG. 4. In this case the control means is constituted by the accelerator 14 that activates tie braking at release towards inactivated position.

This further means that auto braking occurs after barking with the brake pedal 16 where this is disrupted by release of the pedal.

The invention can be executed according to other embodiments than those above described. It may for instance be used on other types of tucks where analogous conditions and problems exist. Furthermore the asynchronous motor can be replaced by some other type of electric motor used at trucks. Furthermore the brake pedal can be replaced by some other control means, as travel direction switch or accelerator according to the second and third brake method above, or some other type of known control means even if the mentioned ones are to be preferred since they are well tested and safe designs.

According to the embodiment the predetermined deceleration characteristics have the rotation speed of the motor as a function of time, which is suitable choice. It may also be possible to control according to other parameters that give a deceleration controlled braking, as vehicle speed or distance.

What is claimed is:

1. A method of controlling braking of an industrial lift vehicle driven by an electric motor, wherein vehicle drive wheel rotational speed is proportional to rotational speed of the electric drive motor, the method wherein upon activation of a control means by a vehicle driver, an electronic control unit sends signals to a control unit of the electric motor to reduce the rotational speed of the motor according to a predetermined deceleration characteristic whereupon a resulting vehicle braking deceleration rate is proportional to a position of the control means, wherein the control means (1) is activatable between a number of different activation positions, and (2) includes a travel direction switch, and, wherein the rotational speed of the electric motor is reduced when the control means is activated according to one of a number of available predetermined deceleration characteristics, where the characteristic is chosen in dependency of the activation position of an accelerator pedal so that the rotational speed is reduced more rapidly the further the accelerator pedal is moved from its initial position whereupon when a driver activates the brake, the same control means position will result in the same deceleration characteristic independent of vehicle load.

2. A method according to claim 1, wherein a number of supplementary brake devices are activated when the control means passes a respective brake device corresponding position, the electric motor control unit feeds the motor the current required for the rotational speed of the motor to correspond to the desired deceleration characteristic.

3. A method according to claim 1, wherein the electric motor comprises an asynchronous motor and wherein the control means includes a brake pedal.

4. A method according to claim 1, wherein the control meat includes an accelerator pedal.

5. A method according to claim 1, wherein one or several available predetermined deceleration characteristics can be varied by adjustment of a parameter influencing the electronic control unit.

6. The method of claim 1, wherein the deceleration rate of the vehicle is independent of the total weight of the vehicle and any load carried thereon.

7. The control system of claim 1, wherein the control means includes a brake pedal, an accelerator pedal or a direction switch.

8. A method of controlling braking of an industrial lift vehicle driven by an electric motor, wherein vehicle drive wheel rotational speed is proportional to rotational speed of the electric drive motor, the method wherein upon activation of a control means by a vehicle driver, an electronic control unit sends signals to a control unit of the electric motor to reduce the rotational speed of the motor according to a predetermined deceleration characteristic whereupon a resulting vehicle braking deceleration rate is proportional to a position of the control means independent of vehicle load, and wherein the control means is activatable between a number of different activation positions, such that when the driver activates the control means past a first position, a supplementary brake device is activated that applies a braking torque on one or more vehicle wheels, the control unit of the electric motor feeding the motor current/torque that is required for the motor rotational speed to correspond the deceleration characteristic in question.

9. A method according to claim 8, wherein a number of supplementary brake devices are activated when the control means passes a respective brake device corresponding position, the electric motor control unit feeds the motor the current required for the rotational speed of the motor to correspond to the desired deceleration characteristic.

10. A method according to claim 8, wherein the electric motor comprises an asynchronous motor and wherein the control means includes a brake pedal.

11. A method according to claim 8, wherein the control means includes a travel direction switch.

12. A method according to claim 11, wherein the rotational speed of the electric motor is reduced according to one of a number of available predetermined deceleration characteristics, where the characteristic is chosen in dependency of the activation position of an accelerator pedal so that the rotational speed is reduced quicker farther the accelerator pedal is from its initial position.

13. A method according to claim 8, wherein the control means includes an accelerator pedal, a brake pedal or a direction switch.

14. A method according to claim 8, wherein one or several available predetermined deceleration characteristics can be varied by adjustment of a parameter influencing the electronic control unit.

15. The method of claim 8, wherein the deceleration rate of the vehicle is independent of the total weight of the vehicle and any load carried thereon.

16. A method of controlling braking of an industrial lift vehicle driven by an electric motor, wherein vehicle drive wheel rotational speed is proportional to rotational speed of the electric drive motor, the method wherein upon activation of a control means by a vehicle driver, an electronic control unit sends signals to a control unit of the electric motor to reduce the rotational speed of the motor according to a predetermined deceleration characteristic whereupon a resulting vehicle braking deceleration rate is proportional to a position of the control means, wherein the electric motor comprises an asynchronous motor, the control means includes a brake pedal, and wherein when the control means passes a first position, an electromagnetic brake is activated working on support wheels arranged in support arms of the vehicle, and when the control means passes a second position close to its mechanical end position an electromagnetic brake is activated working directly or indirectly on the driving wheel.

17. A method according to claim 16, wherein the control means includes a travel direction switch.

18. A method according to claim 17, wherein the rotational speed of the electric motor is reduced according to one of a number of available predetermined deceleration characteristics, where the characteristic is chosen in dependency of the activation position of an accelerator pedal so that the rotational speed is reduced quicker farther the accelerator pedal is from its initial position.

19. A method according to claim 16, wherein the control means includes an accelerator pedal, a brake pedal or a direction switch.

20. A method according to claim 16, wherein one or several available predetermined deceleration characteristics can be varied by adjustment of a parameter influencing the electronic control unit.

21. The method of claim 16, wherein the deceleration rate of the vehicle is independent of the total weight of the vehicle and any load carried thereon.

22. A method of controlling braking of an industrial lift vehicle driven by an electric motor, wherein vehicle drive wheel rotational speed is proportional to rotational speed of the electric drive motor, the method wherein upon activation of a control means by a vehicle driver, an electronic control unit sends signals to a control unit of the electric motor to reduce the rotational speed of the motor according to a predetermined deceleration characteristic whereupon a resulting vehicle braking deceleration rate is proportional to a position of the control means independent of vehicle load, wherein the rotational speed of the electric motor is reduced according to one of a number of available predetermined deceleration characteristics, where the characteristic is chosen in dependency of the activation position of an accelerator pedal so that the rotational speed is reduced more rapidly the further the accelerator pedal is moved from its initial position.

23. A method according to claim 22, wherein the control means includes an accelerator pedal, a brake pedal or a direction switch.

24. A method according to claim 22, wherein one or several available predetermined deceleration characteristics can be varied by adjustment of a parameter influencing the electronic control unit.

25. The method of claim 22, wherein the deceleration rate of the vehicle is independent of the total weight of the vehicle and any load carried thereon.

* * * * *

UNITED STATES PATENT AND TRADEMARK OFFICE
CERTIFICATE OF CORRECTION

PATENT NO. : 6,505,715 B1
DATED : January 14, 2003
INVENTOR(S) : Vikman et al.

It is certified that error appears in the above-identified patent and that said Letters Patent is hereby corrected as shown below:

Title page,
Item [57], ABSTRACT,
Line 1, "motors" should read -- motor --
Line 4, "baking" should read -- braking --

Column 6,
Line 2, "meat" should be -- means --

Signed and Sealed this

Twenty-ninth Day of June, 2004

JON W. DUDAS
*Acting Director of the United States Patent and Trademark Office*